(12) United States Patent
Lichoulas et al.

(10) Patent No.: US 10,353,150 B2
(45) Date of Patent: Jul. 16, 2019

(54) OPTICAL FIBER BULKHEAD SPLICE ASSEMBLIES FOR OPTICAL TRANSCEIVER MODULES

(71) Applicant: AFL Telecommunications LLC, Duncan, SC (US)

(72) Inventors: Ted Lichoulas, Simpsonville, SC (US); Eddie Kimbrell, Dacula, GA (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 16/069,760

(22) PCT Filed: Jan. 17, 2017

(86) PCT No.: PCT/US2017/013701
§ 371 (c)(1),
(2) Date: Jul. 12, 2018

(87) PCT Pub. No.: WO2017/127339
PCT Pub. Date: Jul. 27, 2017

(65) Prior Publication Data
US 2019/0018194 A1  Jan. 17, 2019

Related U.S. Application Data

(60) Provisional application No. 62/280,481, filed on Jan. 19, 2016.

(51) Int. Cl.
*G02B 6/255* (2006.01)
*G02B 6/42* (2006.01)

(52) U.S. Cl.
CPC ............ *G02B 6/255* (2013.01); *G02B 6/421* (2013.01); *G02B 6/4246* (2013.01)

(58) Field of Classification Search
None
See application file for complete search history.

(56) References Cited

U.S. PATENT DOCUMENTS

| 4,676,589 A | 6/1987 | Miyashita et al. |
| 4,778,242 A | 10/1988 | Ota et al. |

(Continued)

FOREIGN PATENT DOCUMENTS

| CN | 2507191 Y | 8/2002 |
| CN | 101674134 A | 3/2010 |

OTHER PUBLICATIONS

AFL Telecommunications LLC; International Patent Application No. PCT/US2017/013701; International Search Report; dated Mar. 28, 2017; (2 pages).

(Continued)

*Primary Examiner* — Chad H Smith
(74) *Attorney, Agent, or Firm* — Dority & Manning, P.A.

(57) ABSTRACT

An optical fiber bulkhead splice assembly may include an optical transceiver module including an enclosure and a bulkhead extending from the enclosure. The optical transceiver module may further include a first optical fiber extending from the enclosure through the bulkhead. The assembly may further include a fiber optic cable comprising a second optical fiber. The assembly may further include a splice sleeve assembly at least partially disposed within the bulkhead. A first end of the first optical fiber and a second end of the second optical fiber may be optically spliced together and disposed within the splice sleeve assembly.

21 Claims, 9 Drawing Sheets

(56) References Cited

U.S. PATENT DOCUMENTS

| | | | |
|---|---|---|---|
| 4,946,249 A | | 8/1990 | Barlow et al. |
| 5,166,997 A | | 11/1992 | Norland et al. |
| 5,351,331 A | | 9/1994 | Chun et al. |
| 5,367,591 A | * | 11/1994 | Seike .................. G02B 6/2558 |
| | | | 156/158 |
| 5,479,553 A | | 12/1995 | Daems et al. |
| 5,642,451 A | | 6/1997 | Kennedy et al. |
| 2003/0044126 A1 | * | 3/2003 | Kawano ............... G02B 6/2551 |
| | | | 385/88 |
| 2005/0207710 A1 | | 9/2005 | Tanaka |
| 2009/0162073 A1 | * | 6/2009 | Ojima .................. G02B 6/2835 |
| | | | 398/139 |
| 2010/0027955 A1 | | 2/2010 | Parikh et al. |
| 2015/0349893 A1 | | 12/2015 | Liao et al. |
| 2016/0004021 A1 | * | 1/2016 | Pelletier .............. G02B 6/4292 |
| | | | 385/14 |

OTHER PUBLICATIONS

AFL Telecommunications LLC; International Patent Application No. PCT/US2016/041835; International Search Report; dated Oct. 18, 2016; (1 page).

* cited by examiner

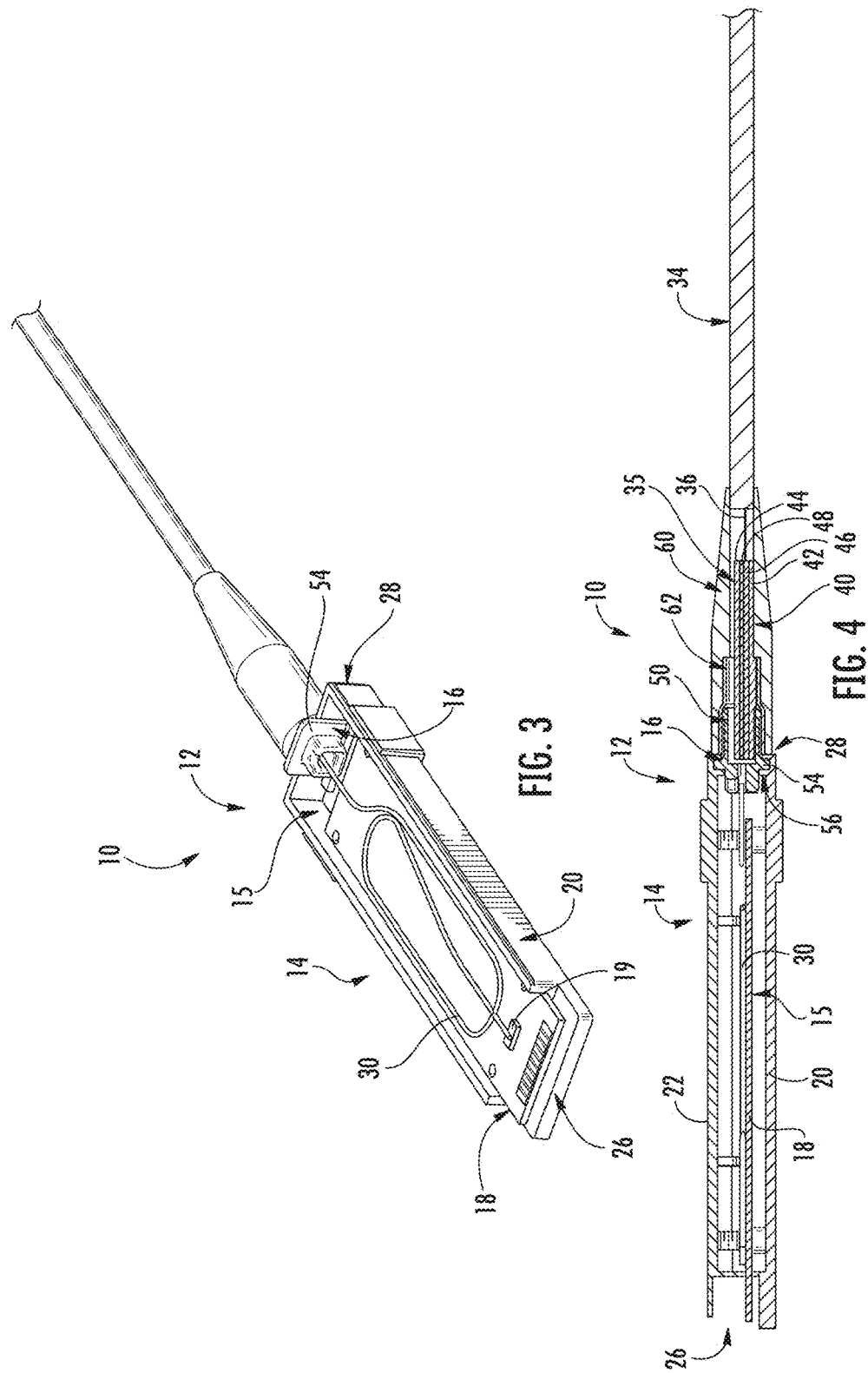

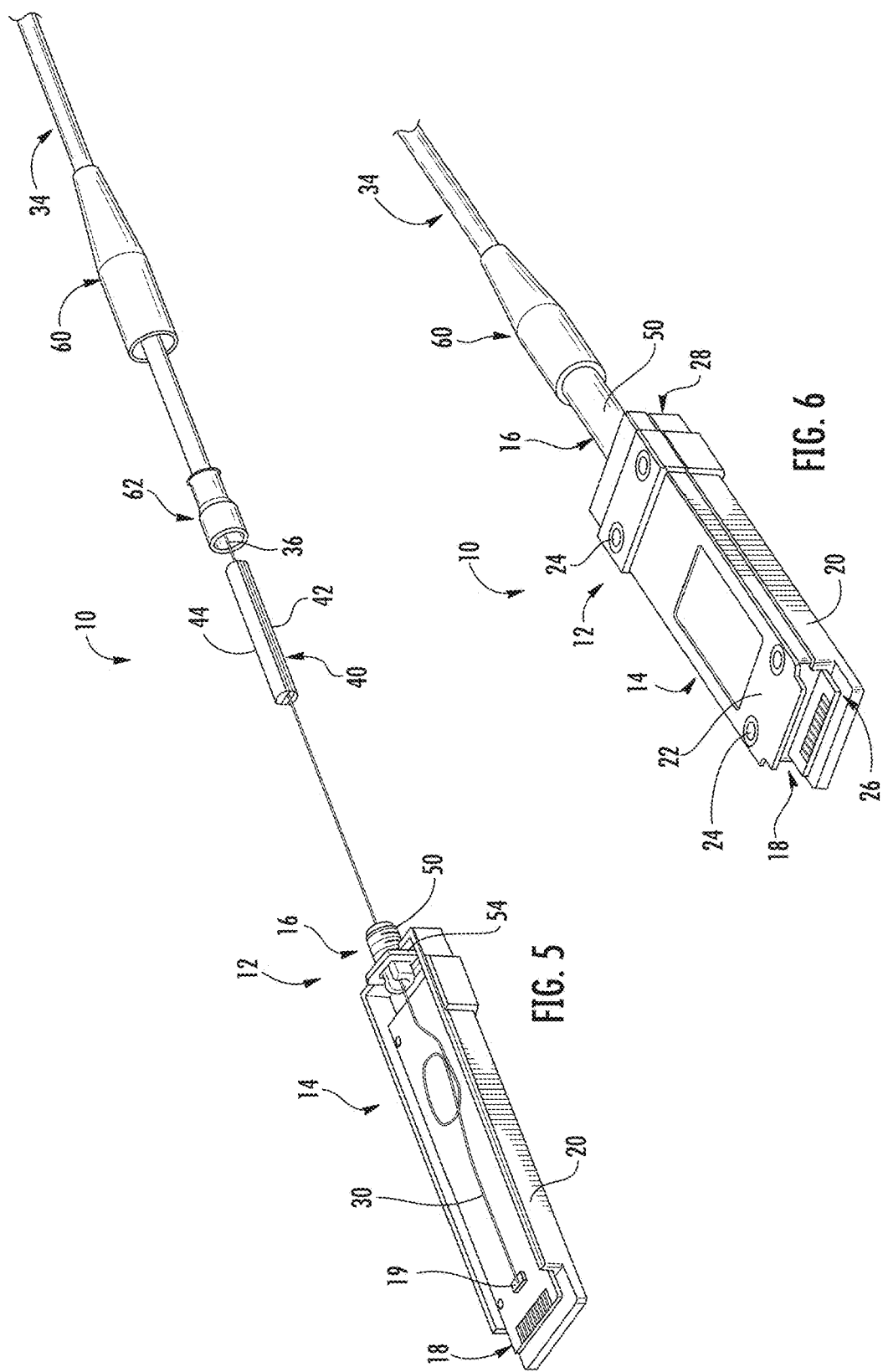

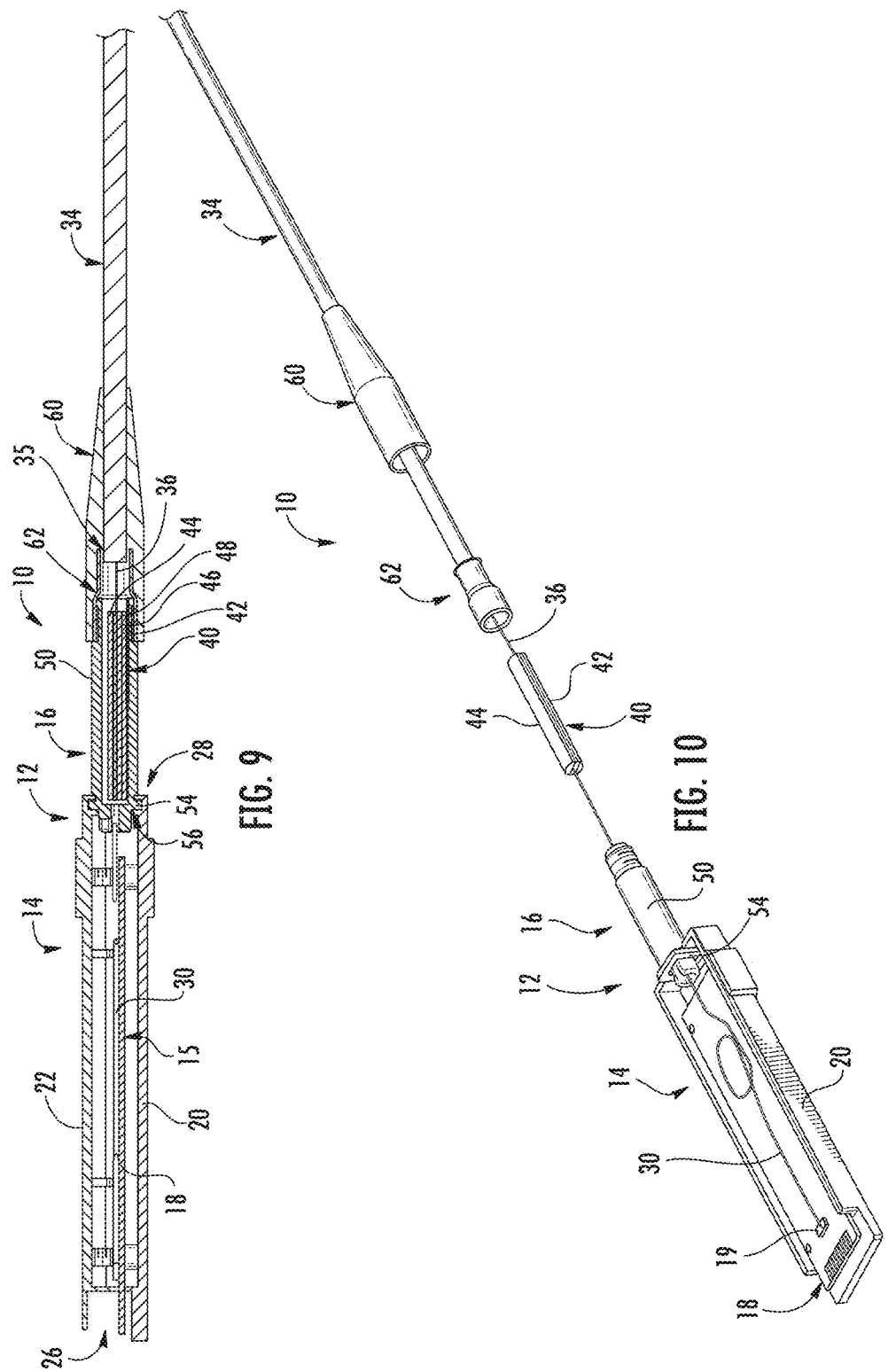

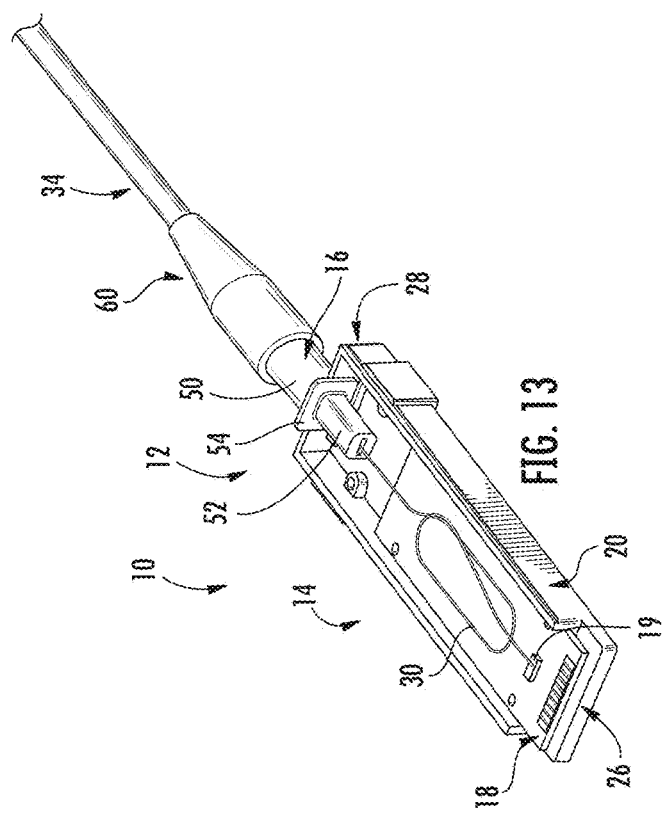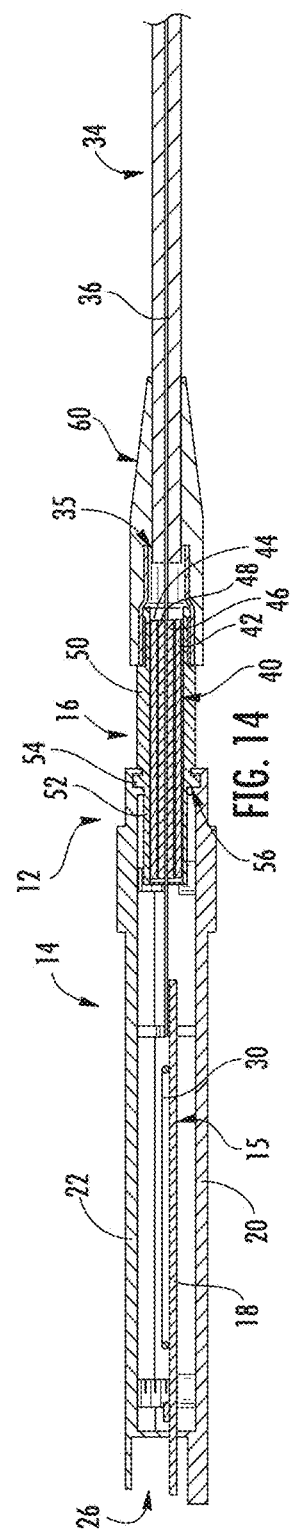

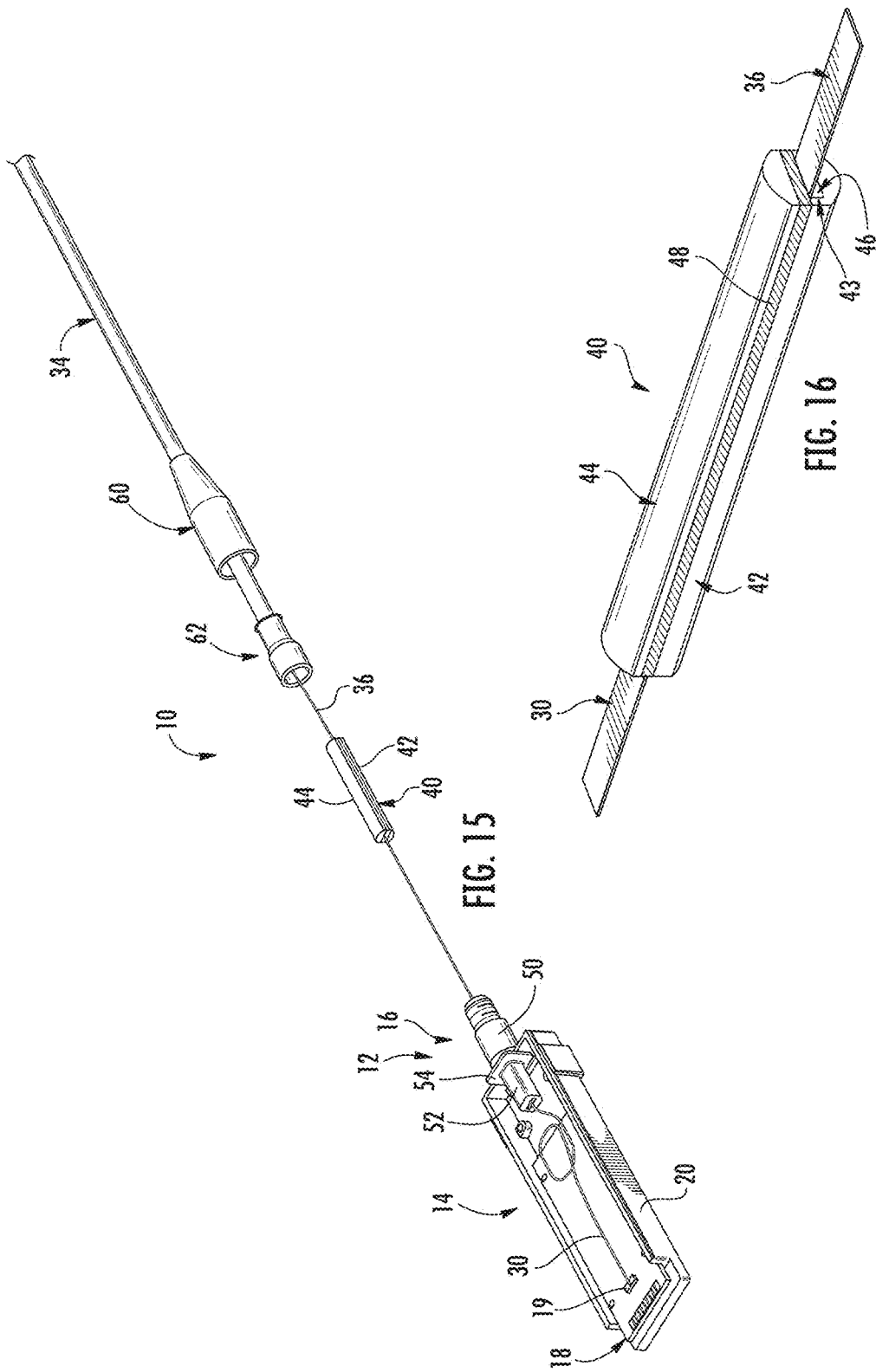

OPTICAL FIBER BULKHEAD SPLICE ASSEMBLIES FOR OPTICAL TRANSCEIVER MODULES

PRIORITY STATEMENT

This application is a National Stage Patent Application of PCT/US2017/013701, filed on Jan. 17, 2017, which claims the benefit of priority to U.S. Provisional Patent Application No. 62/280,481, filed on Jan. 19, 2016, the disclosures of all of which are incorporated by reference herein in their entireties.

FIELD

The present disclosure relates generally to fiber optic interconnections with electronic hardware. More particularly, the present disclosure relates to optical fiber bulkhead splice assemblies for use interconnecting fiber optic cables with transceiver modules.

BACKGROUND

In the data center and high performance computing market, there has been growing demand for high data transfer rate and increased bandwidth. This market demand has resulted in a technological transition from copper to fiber optic transceivers (combined transmitters and receivers), including the implementation of on-board optics and fiber optic backplane connectivity.

Currently, most fiber optic transceiver modules are configured with either receptacles or fixed length pigtails. In order to reduce overall system cost and link loss, there is a trend among system and module manufacturers to configure transceiver modules with pigtails with lengths ranging from 1 meter to 30 meters. Although this connectivity is advantageous for the end-user, integrating long pigtails into a transceiver module can be difficult in manufacturing and results in inventory management challenges for the manufacturer.

Currently, there are two main approaches. A first approach is to build transceivers with discrete pigtails having lengths from 1 meter to 30 meters. This approach requires the manufacturer to stock cable assemblies with discrete lengths from 1 meter to 30 meters with a fiber optic connector, such as an MPO on one end and a v-groove block or lensed connector, such as a PRIZM-LT, on the other end. The manufacture will then attach the cable assembly v-groove block or lensed connector onto the optical engine of the module PCB while managing these variable length cable assemblies. This requires the manufacturer to develop complex handling and assembly fixtures that can compactly store these variable length cable assemblies during the manufacturing process. Additionally, the manufacturer must stock transceiver modules with multiple pigtail lengths to meet an unknown customer demand.

A second approach is to build transceivers with a 1 meter cable stub. The manufacturer would then splice the pigtail of required length onto the 1 meter stub of the transceiver. This approach simplifies the module manufacturing process and reduces the manufacturer's inventory risk. However, this approach also requires the manufacturer to build up a protective cover over the splice point. In particular, commercially available in-line splices typically have an outer diameter that is much larger than the cables they are joining (greater than 6 mm for a 3 mm outer diameter cable) and have a stiff length greater than 100 mm. The size of these inline splices makes it challenging for the end-user to route the splice point within the data center fiber management hardware. Additionally, these inline splice solutions are difficult to assemble, being best suited for factory assembly.

Accordingly, improved assemblies for interconnecting fiber optic cables with transceiver modules are desired in the art.

BRIEF DESCRIPTION

Aspects and advantages of the invention will be set forth in part in the following description, or may be obvious from the description, or may be learned through practice of the invention.

In accordance with embodiments of the present disclosure, an optical fiber bulkhead splice assembly is provided. The assembly may include an optical transceiver module including an enclosure and a bulkhead extending from the enclosure. The optical transceiver module may further include a first optical fiber extending from the enclosure through the bulkhead. The assembly may further include a fiber optic cable comprising a second optical fiber. The assembly may further include a splice sleeve assembly at least partially disposed within the bulkhead. A first end of the first optical fiber and a second end of the second optical fiber may be optically spliced together and disposed within the splice sleeve assembly.

In some embodiments, the assembly further includes a strain relief boot surrounding an exterior barrel of the bulkhead and an end portion of the fiber optic cable. In some embodiments, the assembly further includes a crimp sleeve connected to an exterior barrel of the bulkhead.

In some embodiments, the bulkhead includes an exterior barrel, the exterior barrel extending from the enclosure.

In some embodiments, the bulkhead includes an exterior barrel and the splice sleeve assembly is partially disposed within the exterior barrel and extends from the exterior barrel to external of the bulkhead and the enclosure. In alternative embodiments, the bulkhead includes an exterior barrel and the splice sleeve assembly is entirely disposed within the exterior barrel. In alternative embodiments, the bulkhead includes an exterior barrel and an interior barrel, the interior barrel disposed within the enclosure, and the splice sleeve assembly is partially disposed within the exterior barrel and partially disposed within the interior barrel.

In some embodiments, the splice sleeve assembly includes a base and a lid mated with each other, wherein the first end and the second end are disposed within the splice sleeve assembly between the base and the lid. In some embodiments, the splice sleeve assembly further includes a first adhesive layer and a second adhesive layer, the first adhesive layer and second adhesive layer disposed between the base and the lid.

In some embodiments, a channel is defined in the base, and the first end and the second end are seated in the channel. In some embodiments, the splice sleeve assembly further includes a first adhesive layer and a second adhesive layer, the first adhesive layer and second adhesive layer disposed between the base and the lid, and the first adhesive layer is disposed substantially entirely in the channel.

In some embodiments, the optical transceiver module further comprises a printed circuit board disposed within the enclosure, and wherein the first optical fiber is optically connected to the printed circuit board.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION

A full and enabling disclosure of the present invention, including the best mode thereof, directed to one of ordinary skill in the art, is set forth in the specification, which makes reference to the appended figures, in which:

FIG. 3 is a front perspective view of an optical fiber bulkhead splice assembly, with a module lid removed, in accordance with embodiments of the present disclosure;

FIG. 4 is a cross-sectional view of an optical fiber bulkhead splice assembly in accordance with embodiments of the present disclosure;

FIG. 5 is a perspective exploded assembly view of an optical fiber bulkhead splice assembly in accordance with embodiments of the present disclosure;

FIG. 6 is a front perspective view of an optical fiber bulkhead splice assembly in accordance with alternative embodiments of the present disclosure;

FIG. 9 is a cross-sectional view of an optical fiber bulkhead splice assembly in accordance with alternative embodiments of the present disclosure;

FIG. 10 is a perspective exploded assembly view of an optical fiber bulkhead splice assembly in accordance with alternative embodiments of the present disclosure;

FIG. 13 is a front perspective view of an optical fiber bulkhead splice assembly, with a module lid removed, in accordance with further alternative embodiments of the present disclosure;

FIG. 14 is a cross-sectional view of an optical fiber bulkhead splice assembly in accordance with further alternative embodiments of the present disclosure;

FIG. 15 is a perspective exploded assembly view of an optical fiber bulkhead splice assembly in accordance with further alternative embodiments of the present disclosure;

FIG. 16 is a perspective view of a splice sleeve assembly for an optical fiber bulkhead splice assembly in accordance with embodiments of the present disclosure;

DETAILED DESCRIPTION

Figure 1:
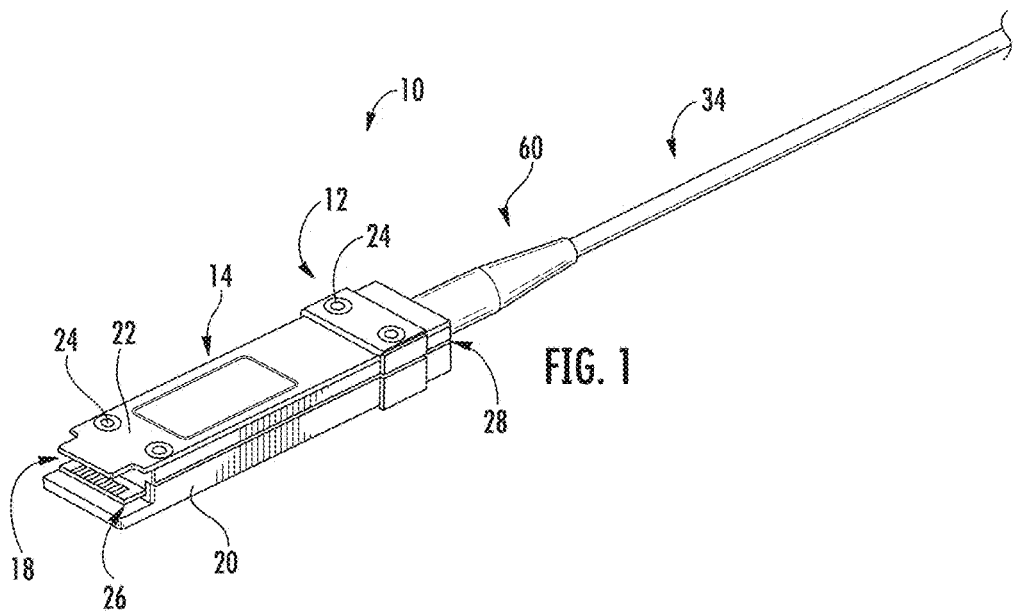
FIG. 1 is a front perspective view of an optical fiber bulkhead splice assembly in accordance with embodiments of the present disclosure.
Figure 2:
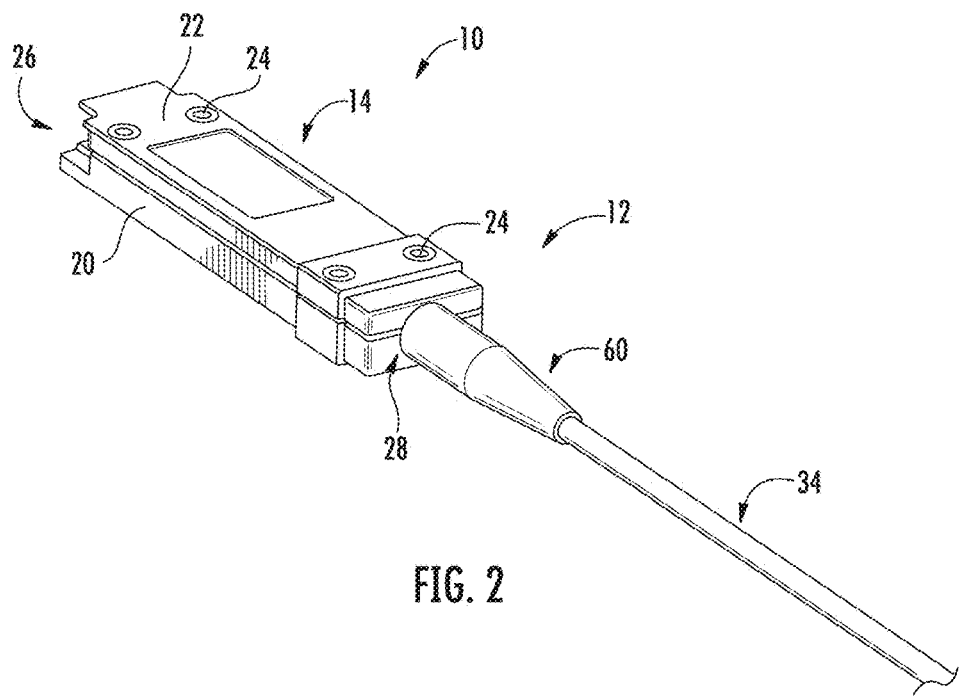
FIG. 2 is a rear perspective view of an optical fiber bulkhead splice assembly in accordance with embodiments of the present disclosure.
Figure 7:
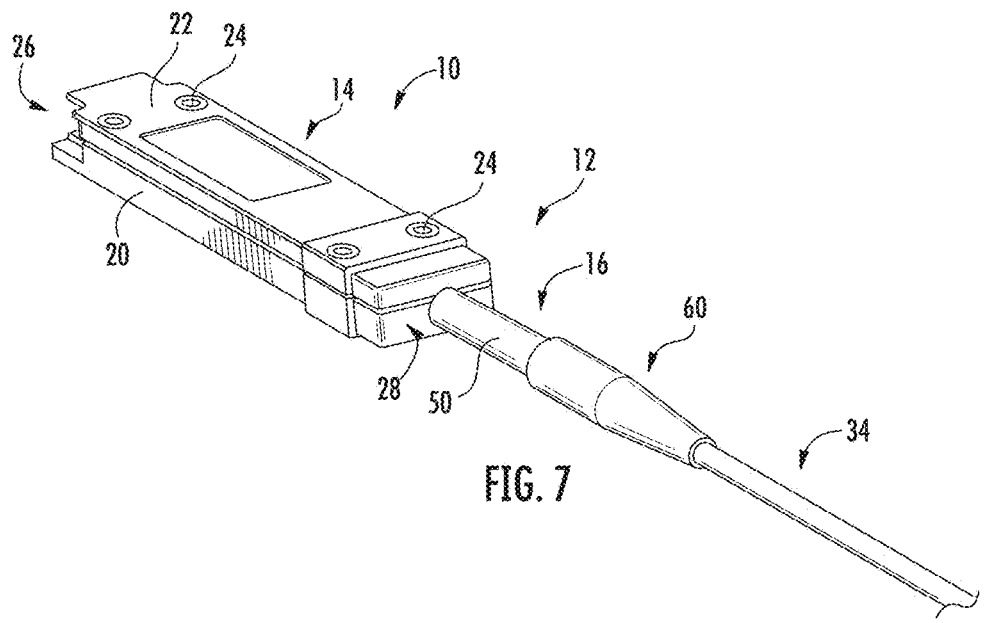
FIG. 7 is a rear perspective view of an optical fiber bulkhead splice assembly in accordance with alternative embodiments of the present disclosure.
Figure 8:
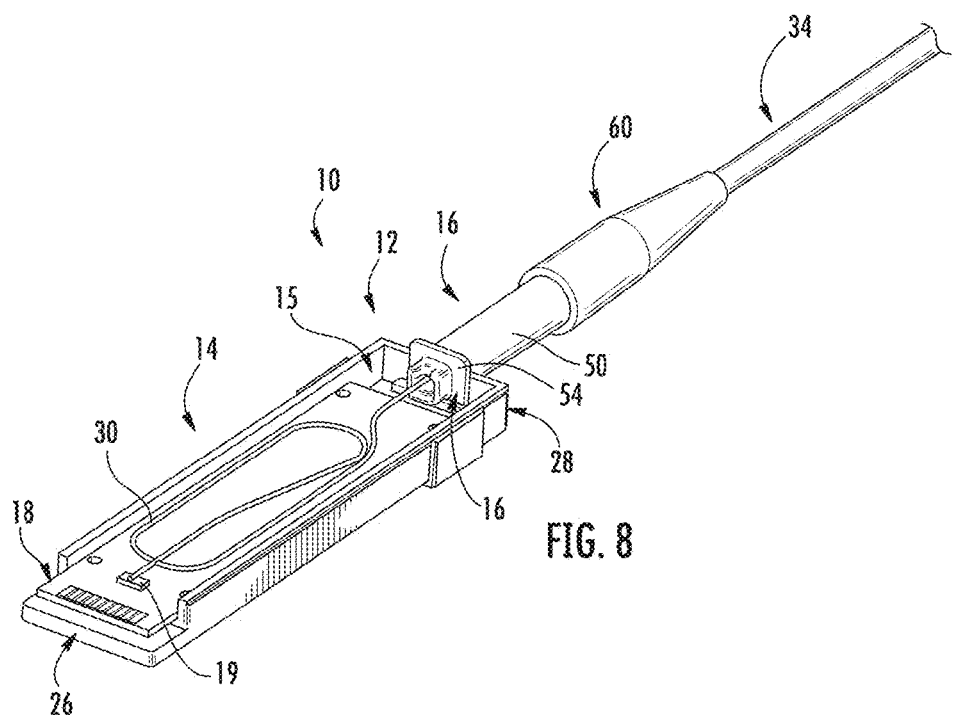
FIG. 8 is a front perspective view of an optical fiber bulkhead splice assembly, with a module lid removed, in accordance with alternative embodiments of the present disclosure.
Figure 11:
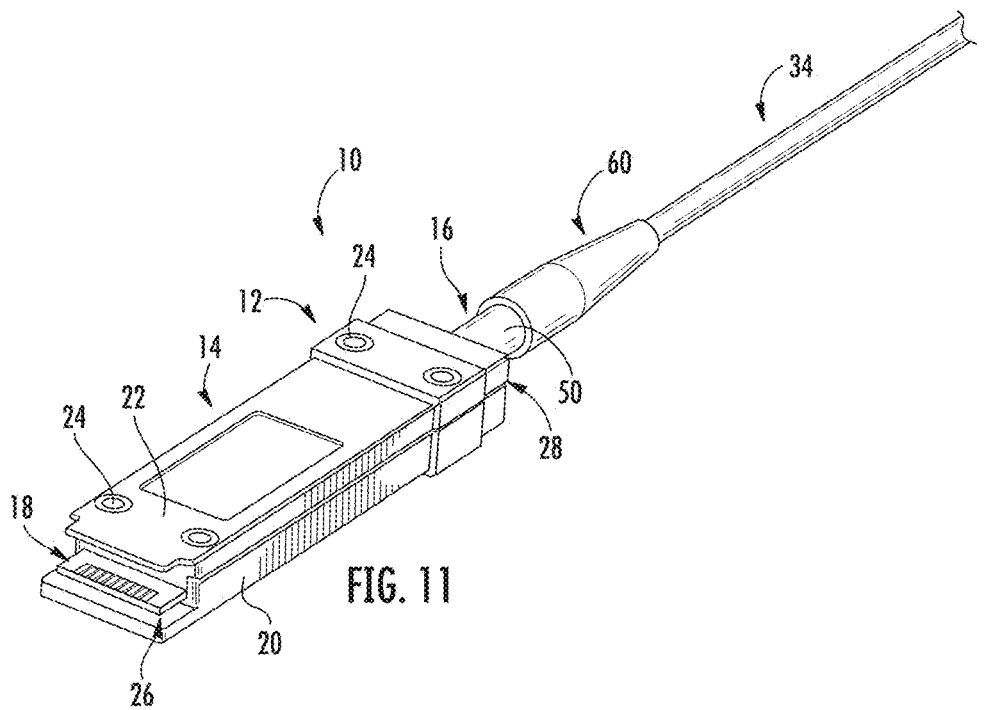
FIG. 11 is a front perspective view of an optical fiber bulkhead splice assembly in accordance with further alternative embodiments of the present disclosure.
Figure 12:
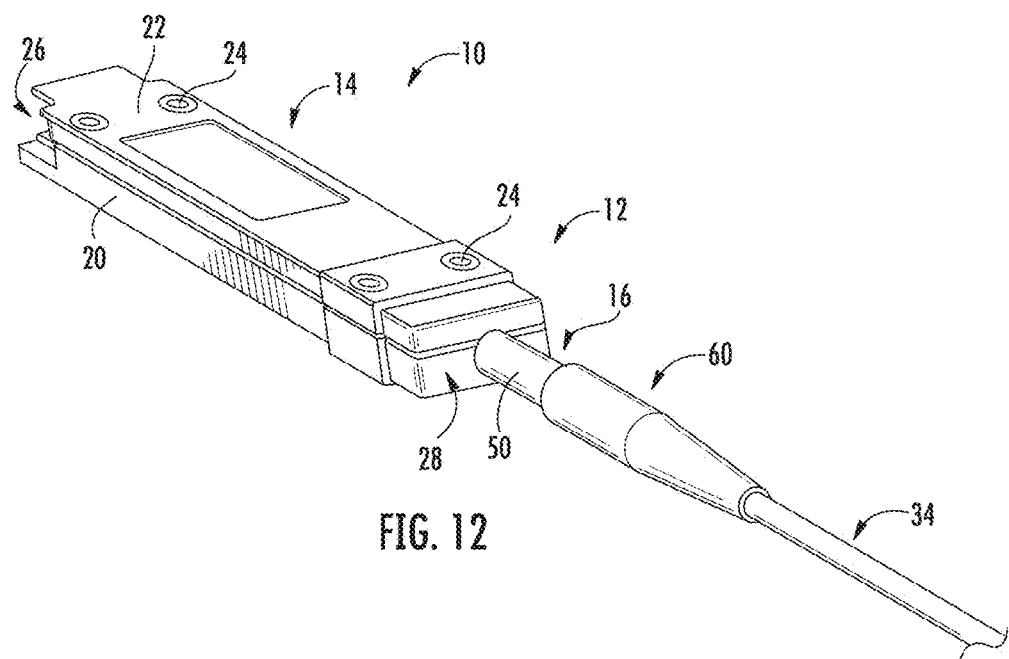
FIG. 12 is a rear perspective view of an optical fiber bulkhead splice assembly in accordance with further alternative embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now generally to FIGS. 1 through 18, embodiments of optical fiber bulkhead splice assemblies 10 and components thereof are provided. An assembly 10 in accordance with the present disclosure includes an optical transceiver module 12. A module 12 in accordance with the present disclosure may be a "QSFP" style module, a "QSFP+" style module, a "CXP" module, or any other suitable module. Module 12 may include an enclosure 14 and a bulkhead 16 which extends from the enclosure 14. A printed circuit board ("PCB") 18 may be disposed within the enclosure 14, such as in an interior 15 thereof.

For example, enclosure 14 may include a base 20 and a top 22. The interior 15 may be defined in the enclosure 14, such as between the base 20 and the top 22. Base 20 and top 22 may be connected together to form the enclosure 14 and define the interior 15 therebetween. For example, mechanical fasteners 24 may connect the base 20 and top 22 together, as shown.

Enclosure 14 may extend along a longitudinal axis between a first end 26 and a second end 28. The first end 26 may be open to facilitate access to the PCB 18. The bulkhead 16 may extend from the second end 28, such as along the longitudinal axis.

The PCB 18 may include an optical interface 19, such as an optical engine, that converts electrical signals to optical signals and optical signals to electrical signals. One or more first optical fibers 30 may be provided, and may be optically connected to the PCB 18, such as at the optical interface 19. In exemplary embodiments, a plurality of first optical fibers 30 may be utilized, and the first optical fibers 30 may ribbonized and thus form a first optical fiber 30 ribbon. Alternatively, the first optical fibers 30 may be loose optical fibers.

The first optical fibers 30 may be routed within the interior 15 of the enclosure 14, such that for example the fibers 30 form a slack loop within the interior 15. The first optical fibers 30 may further extend from the enclosure 14, such as the interior 15 thereof, through the bulkhead 16 thereof. Further, the first optical fibers 30 may be connected to second optical fibers 36 of a fiber optic cable 34. The fiber optic cable 34 may be a standard cable or pigtail, and may include the one or more second optical fibers 36 and one or more outer layers surrounding and protecting the second optical fibers 36, as is generally understood. In exemplary embodiments, a plurality of second optical fibers 36 may be utilized, and the second optical fibers 36 may ribbonized and thus form a second optical fiber 36 ribbon. Alternatively, the second optical fibers 36 may be loose optical fibers.

For example, first optical fibers 30 may include first ends 32, which are ends of the first optical fibers 30 opposite the ends optically connected to the PCB 18. Second optical fibers 36 may include second ends 38 which extend from the outer layers of the cable 34. The first ends 32 and second ends 38 may be spliced together, i.e. via fusion splicing (such as mass fusion splicing), laser fusion splicing, or mechanical splicing. Such splicing connects each first end 32 to a respective second end 38, forming one or more optically spliced together first and second ends, also referred to herein as splice point(s).

Figure 17:
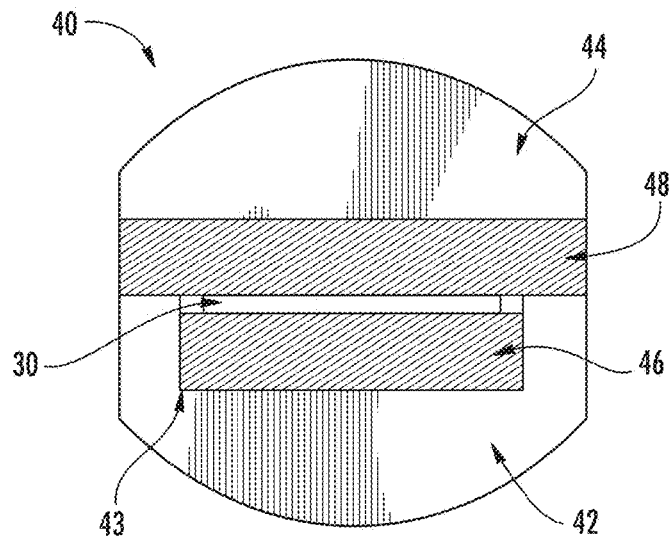
FIG. 17 is an end cross-sectional view of a splice sleeve assembly for an optical fiber bulkhead splice assembly in accordance with embodiments of the present disclosure.
Figure 18:
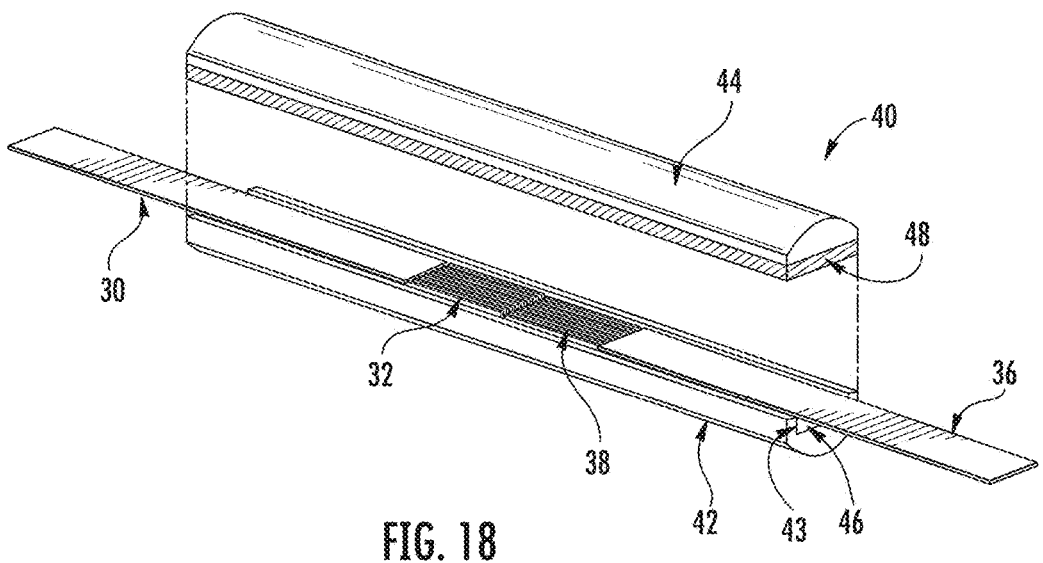
FIG. 18 is a perspective view of a splice sleeve assembly for an optical fiber bulkhead splice assembly, with a lid raised to show internal detail, in accordance with embodiments of the present disclosure.

A splice sleeve assembly 40 may be used to protect the splice point(s) after the various first and second ends 32, 38 are spliced together. Referring now particularly to FIGS. 16 through 18, splice sleeve assembly 40 may include a base 42. The base 42 may have a generally arcuate cross-sectional shape. In some embodiments, as shown, the base 42 may have a solid outer surface. Alternatively, cut-outs may be defined through the base 42 to strengthen and reduce the weight of the base 42. In exemplary embodiments as shown, base 42 may further define an internal channel 43, which may for example, be a U-shaped channel.

Splice sleeve assembly 40 may further include a lid 44. The lid 44 may have a generally arcuate cross-sectional shape. In some embodiments, as shown, the lid 44 may have a solid outer surface. Alternatively, cut-outs may be defined through the lid 44 to strengthen and reduce the weight of the lid 44.

Splice sleeve assembly 40 may further include a first adhesive layer 46 and a second adhesive layer 48. When assembled, the first adhesive layer 46 and second adhesive layer 48 may be disposed between the base 42 and lid 44. For example, the first adhesive layer 46 in exemplary embodiments may be disposed substantially entirely in the channel 43.

As shown, after the first and second ends 32, 38 are spliced together, the spliced-together ends 32, 38 (which in exemplary embodiments are ribbonized) are set on the base 42, such as seated within the channel 43. For example, the spliced-together ends 32, 38 may be set on top of first adhesive layer 46 in channel 43 of the base 42. The first adhesive layer 46 holds the spliced, fibers in a rigid, planar orientation.

The lid 44 is then placed onto the base 42, thus mating the lid 44 and base 42 together. The second adhesive layer 48, disposed for example on the lid 44, bonds to the top surface of the spliced-together ends 32, 38 (which in exemplary embodiments are ribbonized), and may further bond to edges of the base 42 defining the channel 43.

The base 42 and lid 44 are preferably made of a thermally-stable plastic, such as Ultem 2300. As shown, in exemplary embodiments, the thickness of the first adhesive layer 46 is sized such that the first adhesive layer 46 is intentionally shallower than the edges defining the channel 43 of the base 42, allowing the spliced, optical fibers to sit partially below the plane formed by the edges and the top of the base 42. The second adhesive layer 48 is preferably designed to bond to both edges of the base 42 defining the channel 43.

In exemplary embodiments, the splice sleeve assembly 40 may have a length (along a longitudinal axis) of at least 25 mm.

Referring again to FIGS. 1 through 4, 6 through 9, and 11 through 14, the splice sleeve assembly 40 when assembled within the assembly 10 may be at least partially disposed within the bulkhead 16. A bulkhead 16 in accordance with the present disclosure may, for example, be formed from metal, such as a die-cast metal, or another suitable material.

Bulkhead 16 may include, for example, an exterior barrel 50. The exterior barrel 50 may extend from the enclosure 14 (such as the second end 28 thereof) such that at least a portion of the exterior barrel 50 is external to the enclosure 14. In exemplary embodiments, all or a majority of the exterior barrel 50 is external to the enclosure 14. Bulkhead 16 may, in some embodiments such as those illustrated in FIGS. 11 through 14, further include an interior barrel 52. The interior barrel 52 is disposed within (i.e. entirely within) the enclosure 14, such as the interior 15 thereof. The interior barrel 52 may be connected to the exterior barrel 50 such that a continuous channel is defined though the bulkhead 16 by the interior barrel 52 and the exterior barrel 50.

Bulkhead 16 may further include, for example, a flange 54. The flange 54 may extend from the body of the bulkhead 16 defined by the exterior barrel 50 and optional interior barrel 52, and may provide a connection point to facilitate connection of the bulkhead to the enclosure 14. For example, one or slots 56 may be defined in the interior 15, such as on the base 20 and/or top 22. The flange 54 may be disposed within the slot(s) 56 to connect the bulkhead 16 to the enclosure 14.

As discussed, the splice sleeve assembly 40 may be at least partially disposed within the bulkhead 16. For example, in some embodiments as shown in FIGS. 1 through 4, the splice sleeve assembly 40 is partially disposed within the exterior barrel 50 and extends from the exterior barrel 50 to external of the bulkhead 16 and the enclosure 14. Alternatively, in some embodiments as shown in FIGS. 6 through 9, the splice sleeve assembly 40 is entirely disposed within the exterior barrel 50. In these embodiments, the exterior barrel 50 is elongated to accommodate the splice sleeve assembly 40 therein. In further alternative embodiments as shown in FIGS. 11 through 14, the splice sleeve assembly 40 is partially disposed within the exterior barrel 50 and partially disposed within the interior barrel 52. In the embodiments of FIGS. 6 through 9 and FIGS. 11 through 14, the splice sleeve assembly 40 is entirely disposed within the bulkhead 16. In the embodiment of FIGS. 1 through 4, the splice sleeve assembly 40 is only partially disposed within the bulkhead 16.

Referring again to FIGS. 1 through 4, 6 through 10, and 11 through 14, an assembly 10 in accordance with the present disclosure may further include a strain relief boot 60. The strain relief boot 60 may surround the exterior barrel 50 and an end portion 35 of the cable 34. Further, the strain relief boot 60 may abut against the enclosure 14, such as the second end 28 thereof.

Further, in some embodiments, an assembly 10 may further include a crimp sleeve 62. The crimp sleeve 62 may be connected to the exterior barrel 50, and may further be connected to the cable 34, such as the end portion 35 thereof. For example, the crimp sleeve 62 may be crimped to the exterior barrel 50 to connect the cable 34 to the bulkhead 16 and assembly 10 generally. In exemplary embodiments, the strain relief boot 60 is provided over the crimp sleeve 62, exterior barrel 50, and end portion 35 after such crimping occurs.

Referring now to FIGS. 5, 10, and 15, exploded assembly views of assemblies 10 in accordance with various embodiments of the present disclosure are provided. To assemble an assembly 10 in accordance with embodiments of the present disclosure, first optical fibers 30 are pulled out of the module 12 through the bulkhead 16, stripped, and cleaved. The action of pulling the optical fibers 30 through the bulkhead 16 collapses the slack loop. The slack loop size is preferably sufficient to allow for a sufficient length of fiber to be pulled from the module 12 to allow one or more, such as at least two, mass fusion splice attempts.

The cable end 35 is prepared for splicing by removing a portion of the outer layers (i.e. the outer jacket) and cutting back aramid strength members, etc., to expose the second optical fibers 36. If the fiber optic cable 34 contains a fiber optic ribbon, the ribbon will be stripped and cleaved. If the fiber optic cable 34 contains loose fibers, the loose fibers will then be ribbonized, stripped and cleaved.

After splicing the optical fiber ends 32, 38 together, a splice sleeve assembly 40 is installed over the splice point as discussed herein. For example, in exemplary embodiments, after the two ends 32, 38 are spliced, the spliced fibers 30, 38 are set on top of the first adhesive layer 46 in the channel 43. The adhesive layer 46 holds the spliced fibers 30, 38 in a rigid, planar orientation. The splice sleeve lid 44 is then placed onto the splice sleeve base 42. The second adhesive layer 48 on the splice sleeve lid 44 bonds to the top surfaces of the spliced fibers 30, 38 and the edges of base 42 which define the channel 43.

The assembled splice sleeve assembly 40 is then pushed into the bulkhead 16, such as the external barrel 50 and optional internal barrel 52 thereof. This action causes the slack loop to expand back at least somewhat to its pre-splice form. Aramid or other strength members on the cable 34 may then be distributed, such as generally uniformly, around the external barrel 50. Next, the crimp sleeve 62 may be slid over the aramid and connected onto the external barrel 50, such as via crushing or twisting to connect inner threads of the crimp sleeve 62 to mating outer threads on the external barrel 50. Finally, the strain relief boot 60 is then slid over the crimp sleeve 62, exterior barrel 50, and end portion 35.

Accordingly, the present disclosure provides novel bulkhead splice assemblies for optical transceiver modules. Preferred embodiments may provide one or more of the following benefits: the clam-shell style splice sleeve assembly reduces the overall bulkhead splice solution length; the splice sleeve assembly completely or substantially mechanically insulates the splice regions; the bulkhead barrel(s) protects the splice sleeve from mechanical crushing forces; unlike other splice solutions, there is no risk that two mismatched cable jackets could be spliced together; and/or field technicians would have the skill and equipment necessary to install the assembly in the field.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An optical fiber bulkhead splice assembly comprising:
   an optical transceiver module comprising an enclosure and a bulkhead disposed partially within and extending from the enclosure, the optical transceiver module further comprising a first optical fiber extending from the enclosure through the bulkhead;
   a fiber optic cable comprising a second optical fiber; and
   a splice sleeve assembly at least partially disposed within the bulkhead, wherein a first end of the first optical fiber and a second end of the second optical fiber are optically spliced together and disposed within the splice sleeve assembly, wherein the bulkhead comprises an exterior barrel and the splice sleeve assembly is partially disposed within the exterior barrel and extends from the exterior barrel to external of the bulkhead and the enclosure.

2. The optical fiber bulkhead splice assembly of claim 1, further comprising a strain relief boot surrounding the exterior barrel of the bulkhead and an end portion of the fiber optic cable.

3. The optical fiber bulkhead splice assembly of claim 1, further comprising a crimp sleeve connected to the exterior barrel of the bulkhead.

4. The optical fiber bulkhead splice assembly of claim 1, wherein the splice sleeve assembly comprises a base and a lid mated with each other, and wherein the first end and the second end are disposed within the splice sleeve assembly between the base and the lid.

5. The optical fiber bulkhead splice assembly of claim 4, wherein the splice sleeve assembly further comprises a first adhesive layer and a second adhesive layer, the first adhesive layer and second adhesive layer disposed between the base and the lid.

6. The optical fiber bulkhead splice assembly of claim 5, wherein a channel is defined in the base, and wherein the first end and the second end are seated in the channel.

7. The optical fiber bulkhead splice assembly of claim 6, wherein the splice sleeve assembly further comprises a first adhesive layer and a second adhesive layer, the first adhesive layer and second adhesive layer disposed between the base and the lid, and wherein the first adhesive layer is disposed substantially entirely in the channel.

8. The optical fiber bulkhead splice assembly of claim 1, wherein the optical transceiver module further comprises a printed circuit board disposed within the enclosure, and wherein the first optical fiber is optically connected to the printed circuit board.

9. An optical fiber bulkhead splice assembly comprising:
   an optical transceiver module comprising an enclosure and a bulkhead disposed partially within and extending from the enclosure, the optical transceiver module further comprising a printed circuit board disposed within the enclosure and a first optical fiber optically connected to the printed circuit board and extending from the enclosure through the bulkhead;
   a fiber optic cable comprising a second optical fiber; and
   a splice sleeve assembly at least partially disposed within the bulkhead, the splice sleeve assembly comprising a base and a lid mated with each other, and wherein a first end of the first optical fiber and a second end of the second optical fiber are optically spliced together and disposed within the splice sleeve assembly between the base and the lid.

10. The optical fiber bulkhead splice assembly of claim 9, further comprising a strain relief boot surrounding an exterior barrel of the bulkhead and an end portion of the fiber optic cable.

11. The optical fiber bulkhead splice assembly of claim 9, further comprising a crimp sleeve connected to an exterior barrel of the bulkhead.

12. The optical fiber bulkhead splice assembly of claim 9, wherein the bulkhead comprises an exterior barrel and the splice sleeve assembly is partially disposed within the exterior barrel and extends from the exterior barrel to external of the bulkhead and the enclosure.

13. The optical fiber bulkhead splice assembly of claim 9, wherein the bulkhead comprises an exterior barrel and the splice sleeve assembly is entirely disposed within the exterior barrel.

14. The optical fiber bulkhead splice assembly of claim 9, wherein the bulkhead comprises an exterior barrel and an interior barrel, the interior barrel disposed within the enclosure, and wherein the splice sleeve assembly is partially disposed within the exterior barrel and partially disposed within the interior barrel.

15. The optical fiber bulkhead splice assembly of claim 9, wherein the splice sleeve assembly further comprises a first adhesive layer and a second adhesive layer, the first adhesive layer and second adhesive layer disposed between the base and the lid.

16. The optical fiber bulkhead splice assembly of claim 9, wherein a channel is defined in the base, and wherein the first end and the second end are seated in the channel.

17. An optical fiber bulkhead splice assembly comprising:
   an optical transceiver module comprising an enclosure and a bulkhead disposed partially within and extending from the enclosure, the optical transceiver module further comprising a first optical fiber extending from the enclosure through the bulkhead;
   a fiber optic cable comprising a second optical fiber; and
   a splice sleeve assembly at least partially disposed within the bulkhead, wherein a first end of the first optical fiber and a second end of the second optical fiber are optically spliced together and disposed within the splice sleeve assembly, wherein the bulkhead comprises an exterior barrel and an interior barrel, the interior barrel disposed within the enclosure, and wherein the splice sleeve assembly is partially disposed within the exterior barrel and partially disposed within the interior barrel.

18. The optical fiber bulkhead splice assembly of claim 17, further comprising a strain relief boot surrounding the exterior barrel of the bulkhead and an end portion of the fiber optic cable.

19. The optical fiber bulkhead splice assembly of claim 17, further comprising a crimp sleeve connected to the exterior barrel of the bulkhead.

20. The optical fiber bulkhead splice assembly of claim 17, wherein the splice sleeve assembly comprises a base and a lid mated with each other, and wherein the first end and the second end are disposed within the splice sleeve assembly between the base and the lid.

21. The optical fiber bulkhead splice assembly of claim 17, wherein the optical transceiver module further comprises a printed circuit board disposed within the enclosure, and wherein the first optical fiber is optically connected to the printed circuit board.

* * * * *